United States Patent
Telichari et al.

(10) Patent No.: US 10,606,671 B2
(45) Date of Patent: Mar. 31, 2020

(54) PATCHING SYSTEM CALLS IN DATA PROTECTION OPERATIONS

(71) Applicant: EMC IP Holding Company LLC, Hopkinton, MA (US)

(72) Inventors: Tushar P. Telichari, Bangalore (IN); Vaibhav Jain, Bangalore (IN)

(73) Assignee: EMC IP Holding Company LLC, Salt Lake City, UT (US)

( * ) Notice: Subject to any disclaimer, the term of this patent is extended or adjusted under 35 U.S.C. 154(b) by 0 days.

(21) Appl. No.: 16/438,995

(22) Filed: Jun. 12, 2019

(65) Prior Publication Data
US 2019/0294483 A1 Sep. 26, 2019

Related U.S. Application Data

(60) Continuation of application No. 15/948,687, filed on Apr. 9, 2018, now Pat. No. 10,331,503, which is a division of application No. 14/562,229, filed on Dec. 5, 2014, now Pat. No. 9,940,179.

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)

(52) U.S. Cl.
CPC .................................. *G06F 9/545* (2013.01)

(58) Field of Classification Search
CPC ....................................................... G06F 9/542
USPC ......................................................... 719/318
See application file for complete search history.

(56) References Cited

U.S. PATENT DOCUMENTS

| 5,584,023 A | 12/1996 | Hsu et al. |
|---|---|---|
| 2014/0059573 A1 | 2/2014 | Jawa et al. |
| 2015/0222637 A1 | 8/2015 | Hung et al. |
| 2015/0269357 A1 | 9/2015 | Taneja et al. |
| 2016/0132365 A1 | 5/2016 | Pan et al. |

*Primary Examiner* — Timothy A Mudrick
(74) *Attorney, Agent, or Firm* — Workman Nydegger

(57) ABSTRACT

Systems and methods for patching system calls issued on a device. System calls are patched by transforming system calls to provide additional functionality. The system calls can then be rerouted to the updated or custom functions.

20 Claims, 5 Drawing Sheets

PATCHING SYSTEM CALLS IN DATA PROTECTION OPERATIONS

FIELD OF THE INVENTION

Embodiments of the present invention generally to system calls in computing systems or in operating systems and to systems and methods for performing data protection operations. More particularly, embodiments of the invention relate to systems and methods for controlling system calls in a data protection system.

BACKGROUND

Protecting data by backing up the data (and restoring the data when necessary) is an important aspect of many computing systems. Data protection systems can be implemented in a wide range of computing systems that involve a wide variety of operating systems. Because of the variety of computing systems and different operating systems, backup operations and/or restore operations are often performed differently. More specifically, backup and restore operations can be implemented differently in different operating systems in part because the operating systems and the interaction with devices such as block devices differ among operating systems.

Many operating systems, for example, include a user space and a kernel space (kernel) or something similar. A kernel is often responsible for managing certain requests from application software or other software that typically operate in the user space. The functionality available in one kernel space may differ from the functionality available in the kernel space of another operating system.

General, the kernel manages access to a computer's resources. A kernel may perform device management, memory management and may respond to system calls. For example, the kernel may decide which processes have access to a processor, determine and manage the memory available to processes or applications, and accommodate requests for input/output (TO) devices.

When an application needs to access an TO device, a system call may be issued. A system call is used by an application or process to make a request to a kernel of an operating system. Unfortunately, some operations that need to be performed cannot be achieved using default system calls. Systems and methods are therefore needed to enable additional functionality for system calls.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
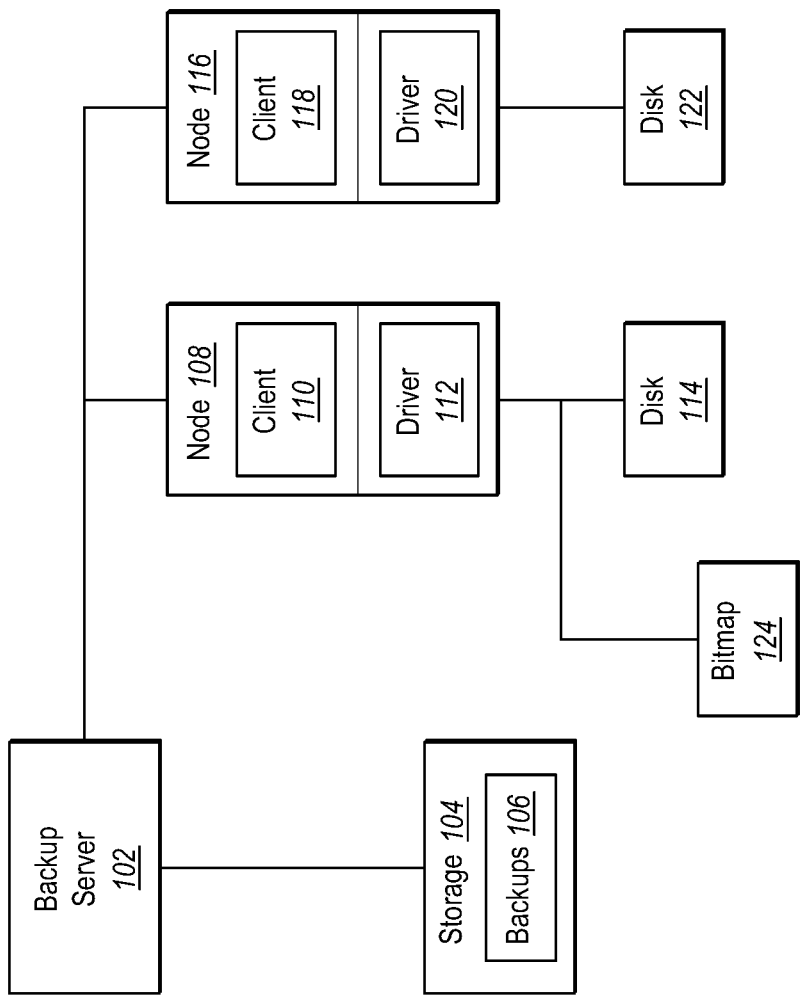
FIG. 1 illustrates an example of a computing network in which data protection operations including backup and/or restore operations may be performed.

Embodiments of the invention generally relate to systems and methods for performing data protection operations such as, but not limited to, backup operations and/or restore operations. Embodiments of the invention relate to providing additional functionality to system calls, for example, when performing data protection operations. The additional functionality is achieved, for example, by patching the default functions of a system call with custom functions. The customized functions of a patched system call may include all, a portion, or none of the default functions of the system call.

For example, embodiments of the invention provide the additional functionality by patching at least one system call with customized service routines. This may be achieved by trapping certain system calls and redirecting the system calls to the custom service routines or to the customized functionality. In one example, the original service routines or default functions remain available and may be performed in response to a system call from another application. This allows a backup operation to invoke custom functions while ensuring that the default functions remain available to other applications. In addition, patching a system call also enables functionality that may not be available in the kernel be default.

In one example, a backup application may perform a write tracking operation. The write tracking operation may be implemented as a write tracking driver. The communication between the backup application and the write tracking driver may occur during a backup (or restore) operation or between backup (or restore) operations and/or both. The write tracking driver is configured to track information about disk blocks that change between two backup operations. This facilitates performing an incremental backup operation.

The write tracking driver may operate in an operating system's kernel space or kernel. As a result, communication with between the backup operation and the write tracking operation may be accomplished using system calls. In one example, each volume in a computing system may be associated with its own write tracking driver in part because certain system calls are often device specific.

Embodiments of the invention allow the service routines or default functions of a system call to be changed or patched. As a result, a system call executed on a block device in an operating system (e.g., a Linux operating system) can include performing customized functions. This allows an application to perform kernel functions that are may not be available in the kernel by default.

An IOCTL (Input Output Control) system call (e.g., IOCTL calls, Compact IOCTL calls, Locked IOCTL calls) is an example of a system call and embodiments of the invention are discussed in the context of IOCTL system calls. One of skill in the art can appreciate, with the benefit of the present disclosure, that embodiments of the invention can be used with other system calls.

IOCTL is a system call that provides an interface for invoking device-specific IO operations. Embodiments of the invention enable different or additional operations that cannot be achieved with a conventional IOCTL system call. In one example, existing IOCTL service routines or functions can be extended (e.g., replaced, patched) by trapping the IOCTL control system call and redirecting the IOCTL system call to different service routines or custom functions. The new service routines or custom functions can then be performed. Thus, for a volume residing on a block device, embodiments can transform an IOCTL system call to a customized system call. In one example, however, the conventional IOCTL service routines remain available. Further, the customized functions may not be available to other applications and are only available to, in this example, the backup and/or restore operation.

When an IOCTL system call is made, it is typically associated with certain parameters that include a request code. When the backup application issues an IOCTL system call, the request code is different from the request code associated with another application that may issue an IOCTL system call. When the request code associated with the backup operation is identified, the new service routines or customized functions may be performed. When a different request code is identified, the regular or default service routines may be performed. Request codes can enable user space access to kernel functions.

Patching the system call may include various processes. Initially, the system call is patched. Patching the system call prepares the system call for use by the data protection application (the backup and/or restore operation). After the system call is patched, the system call can respond to the data protection application by providing the customized functionality. For example, processing the system call can include invoking the customized functions when the appropriate request code of the backup application is identified or invoking a native or default functions when the request code of another application is detected. Finally, the system call may be unpatched in some instances such that the customized functionality is removed.

As previously discussed, a backup operation such as a block-based backup operation may use or access a write tracking driver (or a write tracking operation) to monitor disk updates to a disk. The write tracking driver attaches to the disk in order to intercept writes to the disk. The updates are maintained as a bitmap in one example and are consumed by a backup operation during a subsequent backup operation. Communication between the backup application and the write tracking driver may be achieved using system calls (e.g., IOCTL system calls). IOCTL system calls are implemented for a disk that is being tracked. The customized functions provide functions that may be specific to the backup operation.

By way of example only and not limitations, some of the customized functionality may include a function to begin tracking a specific volume with a designated backup level. Another customized function may be to return subsets of extents for a given volume. Another customized function may be to close a session with the write tracking driver.

When an IOCTL system call is issued on a tracked disk, a check is performed to determine if the IOCTL system call is specific to the backup application (e.g., by evaluating the request code) or is a default request (e.g., an operating system request or other application request). If the IOCL system call does not belong to the backup application, the default service routines or default function call sequence is executed. If the IOCTL system call belongs to the backup application, then custom service routines or a custom function call sequence is invoked. When the disk or module is unloaded or a disk is removed, the original flow of the IOCTL system call is restored by unpatching the system call. The system call may be unpatched in other situations as well, for example, at request of a user.

FIG. 1 illustrates an example of an environment for implementing embodiments of the invention. FIG. 1 illustrates a network 100, which is an example of a computing environment. The network 100 may include server computers, client computers, or the like. The network may include different types of servers (e.g., file servers, email servers, databases, or the like), storage devices (network storage, local storage), client devices, connections (wired and/or wireless) or the like.

The network 100 illustrates at least some of the devices that may be involved in a backup operation. FIG. 1 illustrates a backup server 102 that is associated with storage 104. The storage 104 stores backups 106 of the data in the network 100. The storage 104 may be part of the network's storage or may be specific to the backup server 102. The nodes 108 and 116 are examples of devices that may be present in the network. The nodes 108 and 116 may be server devices or servers, storage arrays, desktop computers, other clients or network attached devices or the like. Embodiments of the invention can be implemented in computing environments that may include virtual machines as well.

In one example, a client 110 is loaded on the node 108. The client 110 is an agent or an application that coordinates with the backup server 102 to generate a backup of the data on at least the disk 114. The node 108 may be associated with other storage devices of other configurations. The client 110 may be configured to backup all of the storage and/or data associated with the node 108. In one embodiment, the node 108 or client 110 may be able to coordinate a backup of other nodes in the network 100.

The client 110 may be operating in a user space of an operating system present on the node 108. A driver 112 may be operating in a kernel space of the same operating system. The client 110 may be an example of a backup application and the driver 112 may be an example of a write tracking driver.

The driver 112 is configured to at least monitor writes to the disk 114. When a change occurs to the disk 114 (e.g., a write), the write is detected by the driver 112 and an appropriate entry is made in a bitmap 124. The bitmap 124 may identify blocks that have changed since the most recent backup of the disk 114. When a subsequent incremental backup operation is performed, only the blocks that have changed need be backed up. The blocks that have changed are identified by the bitmap 124. The changes identified in the bitmap 124 may be consumed during a subsequent backup operation.

The client 110 may communicate with the driver 112 using system calls including an IOCTL system call. The IOCTL system call may be accompanied with or include a request code (e.g., as a parameter). When an IOCTL system call is issued, it is checked to determine if the IOCTL system call belongs to the client 110 (the backup application) based on the request code included in the IOCTL system call.

Functionality of the IOCTL system call is then performed based on this determination. In one example, the service routines or functions performed when the IOCTL system call belongs to the client 110 may be different from the service routines or functions performed when the IOCTL system call belongs to another application. The node 116 is similarly associated with a client 118, a driver 120, and a disk 122. In one example, the IOCTL system calls may be patched for both the disk 114 and the disk 122. In one example, IOCTL system call may be device specific.

Figure 2:
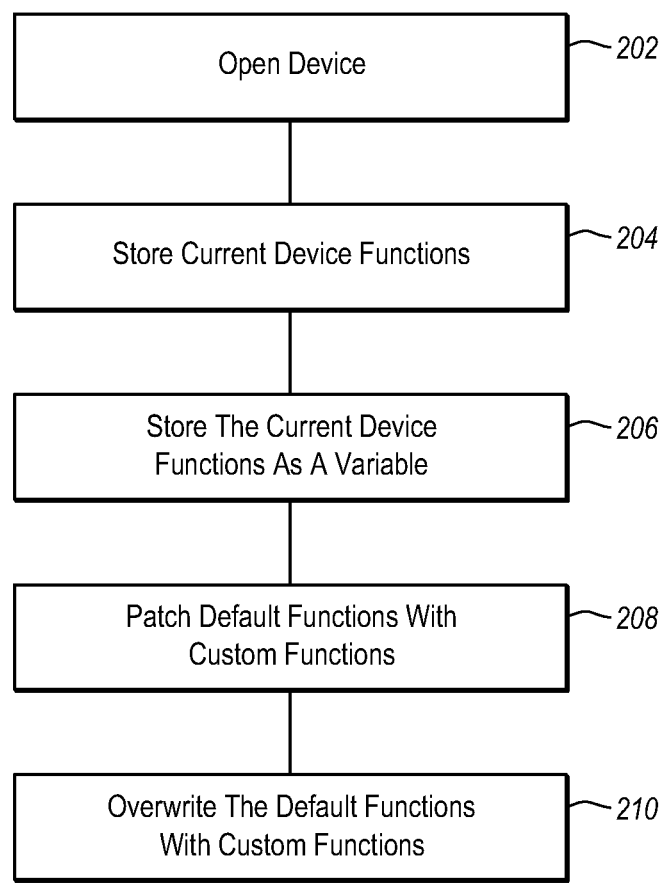
FIG. 2 is an example of a flow diagram for patching a system call with custom functionality.

FIG. 2 illustrates an example of a method for patching a system call. Patching a system call enables customized service routines or customized functions to be performed when the system call is performed after the system call has been patched patched. The method 200 of patching the system call may begin by opening a device such as the disk 114 in box 202 (e.g., open_by_devnum). In box 204, current device operations are stored. Stated differently, the default operations or functions of the device (or portions thereof) are backed up. This may include backing up the default function pointers for the block operations of the device. Thus, the current block device operations structure for the device opened in block 202 are stored in block 204 (e.g., oldops=vol→vi_blockfops_old=(struct block_device_operations*)(bdev→bd_disk→fops)), In block 206, the current block device operations are stored in a variable (e.g., memcpy(&vol→vi_blockfops, oldops, sizeof(vol→vi_blockfops)).

Next, in block 208, certain system calls are patched with custom functions. In the following examples, various ioctl related functions are patched.

```
/* populate the block operations with patched versions */
vol->vi_blockfops.ioctl = &filter_volume_ioctl;
vol->vi_blockfops.compat_ioctl = &filter_volume_compat_ioctl;
#if version check
vol->vi_blockfops.locked_ioctl = &filter_volume_locked_ioctl;
#endif
```

In block 220, the default operations are overwritten with the patched entries as follows.

oldops=cmpxchg((struct block_device_operations**)&(bdev→bd_disk→fops), oldops, &vol→vi_blockfops);

The foregoing method 200 illustrates a method for patching the IOCTL functions of a block device. FIG. 2 further illustrates that when the patching process is completed, the patched functions and the original functions both exist. This allows the system call to be directed to the appropriate functions based on the request code and also allows the original functions to be fully restored when the IOCTL components are unpatched. In one example, pointers may be used to direct a system call to the appropriate functions.

The method of patching a system call may also be performed as follows. After opening a target device (e.g., a block device such as a disk), default function pointers for operations the block device are backed up. Then, both function pointers for block device operations and a backup copy exist. Then, a copy of a block device operations structure for patching is created. Both a copy of a block device operations structure and a copy exist.

After the block device operations structure is backed up, the system calls are updated or overwritten with custom functions. Then, the original block device operations are updated with modified structure of function pointers. After this process is completed, the system call can be processed.

Figure 3:
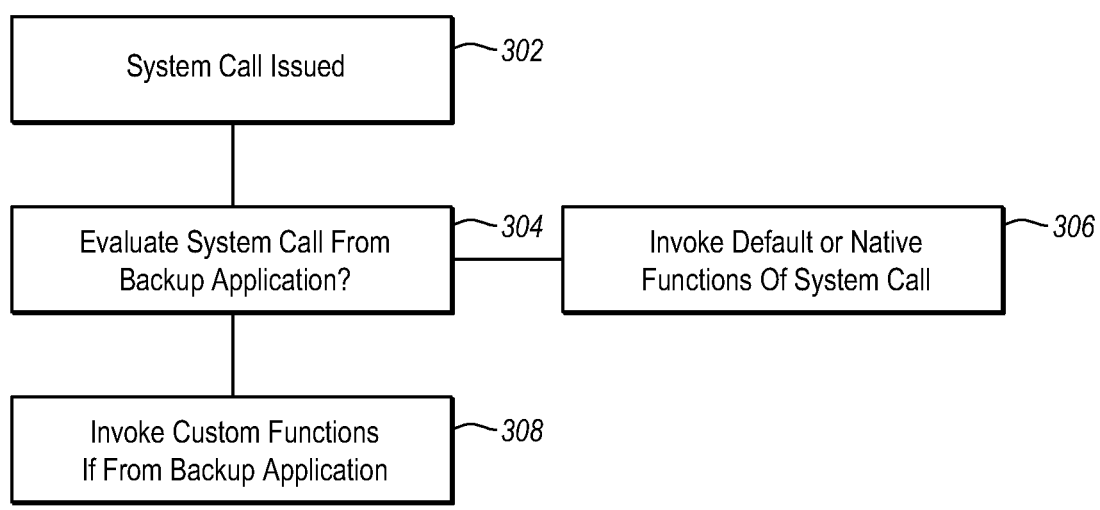
FIG. 3 is an example of a flow diagram for accessing and performing at least the custom functionality of a patched system call.

FIG. 3 illustrates a method 300 for processing system calls such as patched IOCTL system calls. In box 302, a system call is issued from an application such as the backup application or from another source. In box 304 the system call is evaluated to determine whether the system call originated with or belongs to the backup operation (e.g., the client 110). This can be done by evaluating the request code that is included in the system call. Ownership of the system call can be determined from the request code, which may be specific to an application.

If the system call did not originate with the backup operation, then the native or default functions of the system call are invoked in box 306. Because the original functions were not deleted, but were copied, the original functions can still be invoked. The request is then directed to the original or default functions (e.g., by an appropriate pointer(s)).

If the request code in the system call belongs to or identifies the backup application, then the custom functions are invoked in box 308. The request is directed to the customized functions (e.g., by an appropriate pointer(s)). Thus, the customized functions or service routines are performed in response to the system call from the backup operation.

Figure 4:
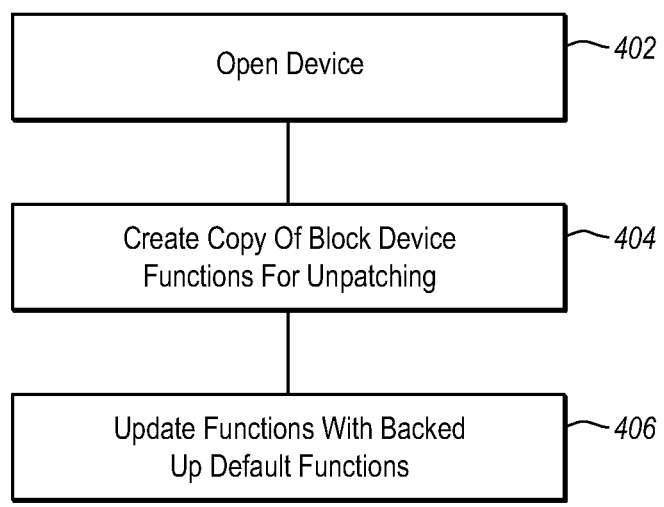
FIG. 4 is an example of a flow diagram for unpatching a system call such that the customized functionality is removed.

FIG. 4 illustrates a method for unpatching a system call or for removing the customized functionality. In block 402, the device is opened. In box 404, a copy of the block device operations structure for unpatching is created. If the system call is not patched by another process, then the block device operations are updated with the structure that was backed up during the patching process.

The following pseudo-code illustrates an example of a block device operations structure.

```
struct block_device_operations {
    int (*open) (struct block_device *, fmode_t);
    int (*release) (struct gendisk *, fmode_t);
    int (*ioctl) (struct block_device *, fmode_t, unsigned, unsigned long);
    int (*compat_ioctl) (struct block_device *, fmode_t, unsigned, unsigned long);
    int (*direct_access) (struct block_device *, sector_t,
            void **, unsigned long *);
    unsigned int (*check_events) (struct gendisk *disk,
            unsigned int clearing);
    /* ->media_changed( ) is DEPRECATED, use ->check_events( ) instead
    */
    int (*media_changed) (struct gendisk *);
    void (*unlock_native_capacity) (struct gendisk *);
    int (*revalidate_disk) (struct gendisk *);
    int (*getgeo)(struct block_device *, struct hd_geometry *);
    /* this callback is with swap_lock and sometimes page table lock held */
    void (*swap_slot_free_notify) (struct block_device *, unsigned long);
    struct module *owner;
}
```

The following code identifies an example newly defined structure that has been patched.

```
/* Per-volume data structure */
struct volume_info {
----SNIP----
    /* Holds the patched block fops for this device */
    struct block_device_operations vi_blockfops;
    /* Holds the old block fops of the block device */
    struct block_device_operations *vi_blockfops_old;
----SNIP----
```

This is an example that both the patched functions and the default functions remain available and either can be performed.

In one example, the driver 112 may perform operations between actual backups. The driver 112 is configured to track changes to a block device such as the disk 114. By patching the system call additional functions can be performed with respect to the block device (e.g., the disk 114). As previously stated, by patching the system call, the driver 112 can be caused to perform the customized functions.

The driver 112 can make an entry in the bitmap when a write occurs to the disk. The driver 112 can cause the bitmap to be cleared or updated once a backup is performed so that the changes subsequent to a backup can be tracked.

The IOCTL system call may include various parameters that may include, but are not limited to, a device identifier and a request code. These parameters may be evaluated when deciding whether to invoke the customized functions or the default functions.

Figure 5:
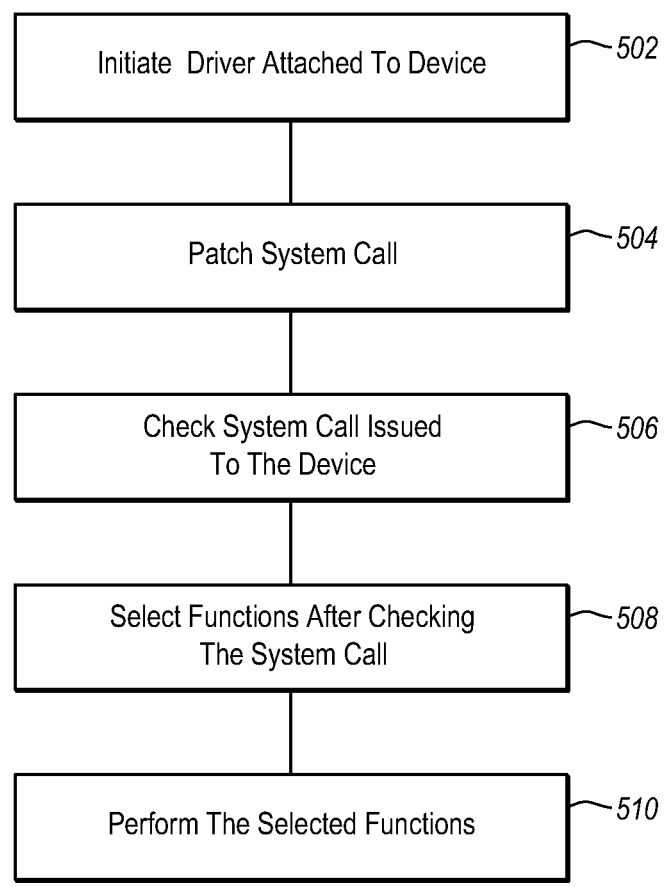
FIG. 5 illustrates an example of a method for communicating with a write tracking driver with a system call.

FIG. 5 is an example of a method for communicating with a write tracking driver. In block 502, the writer tracking driver is initiated for a particular device such as a volume or disk. In block 504, the system call is patched. In one example, the system call is patched as part of the driver initialization process. The system call may be patched as previously described.

In block 506, the system call is checked whenever the system call is issued on the tracked disk. In block 508, a function sequence is selected. In one example when the system call is operating system specific and not necessarily specific to the backup application, a default function sequence is selected. When selecting a function sequence, an appropriate pointer to the corresponding device operations structure may be provided. When the system call is specific to the backup application, a customized function sequence is selected. In block 510, the selected function sequence is operated.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for patching a system call, the method comprising:
    backing up default functions of a block device associated with the system call in a backup copy of a block device operations structure, wherein the backup copy includes the default functions associated with the system call;

associating the block device operations structure with custom functions associated with a specific application, wherein the default functions and the custom functions are available to the system call; and performing the custom functions when the system call is issued by the specific application; and performing the default functions when the system call is issued by a different application.

2. The method of claim 1, wherein the block device operations structure includes pointers to the default functions and wherein the block device operations structure includes pointers to the custom functions.

3. The method of claim 1, wherein the specific application is a data protection application.

4. The method of claim 1, further comprising opening the block device associated with the system call.

5. The method of claim 1, further comprising overwriting the default functions in the block device operations structure with the custom functions.

6. The method of claim 1, further comprising removing the custom functions from the block device operations structure.

7. The method of claim 1, further comprising restoring the default functions to the block device operations structure.

8. The method of claim 1, further comprising performing the specific application.

9. The method of claim 1, wherein the specific application comprises a data protection application and wherein the system call relates to a write tracking driver in a kernel.

10. The method of claim 1, further comprising determining which of the specific application and the different application issued the system call based on one or more of a device identifier and a request code included with the system call.

11. A non-transitory computer readable medium comprising computer executable instructions for performing a method for patching a system call, the instructions comprising:

backing up default functions of a block device associated with the system call in a backup copy of a block device operations structure, wherein the backup copy includes the default functions associated with the system call;

associating the block device operations structure with custom functions associated with a specific application, wherein the default functions and the custom functions are available to the system call; and performing the custom functions when the system call is issued by the specific application; and performing the default functions when the system call is issued by a different application.

12. The non-transitory computer readable medium of claim 11, wherein the block device operations structure includes pointers to the default functions and wherein the block device operations structure includes pointers to the custom functions.

13. The non-transitory computer readable medium of claim 11, further wherein the specific application is a data protection application.

14. The non-transitory computer readable medium of claim 11, the instructions further comprising opening the block device associated with the system call.

15. The non-transitory computer readable medium of claim 11, the instructions further comprising overwriting the default functions in the block device operations structure with the custom functions.

16. The non-transitory computer readable medium of claim 11, the instructions further comprising removing the custom functions from the block device operations structure.

17. The non-transitory computer readable medium of claim 11, the instructions further comprising restoring the default functions to the block device operations structure.

18. The non-transitory computer readable medium of claim 11, the instructions further comprising performing the specific application.

19. The non-transitory computer readable medium of claim 11, wherein the specific application comprises a data protection application and wherein the system call relates to a write tracking driver in a kernel.

20. The non-transitory computer readable medium of claim 11, the instructions further comprising determining which of the specific application and the different application issued the system call based on one or more of a device identifier and a request code included with the system call.

* * * * *